Oct. 11, 1938. W. O. HAMPTON ET AL 2,132,685
CONTACT MEANS
Filed June 4, 1934   3 Sheets-Sheet 1
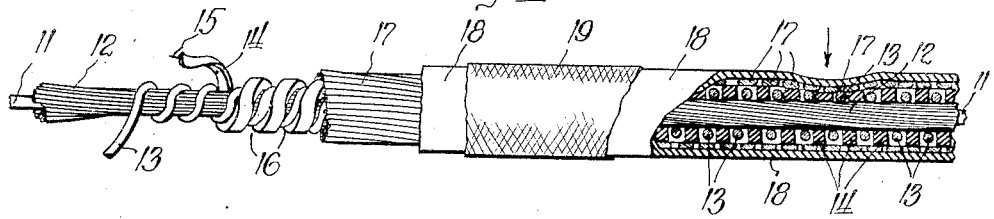
Fig. 1.
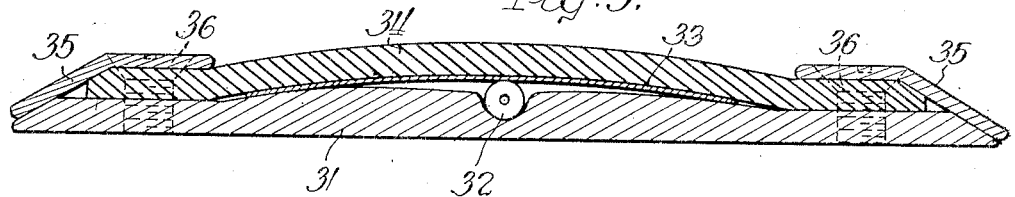
Fig. 3.
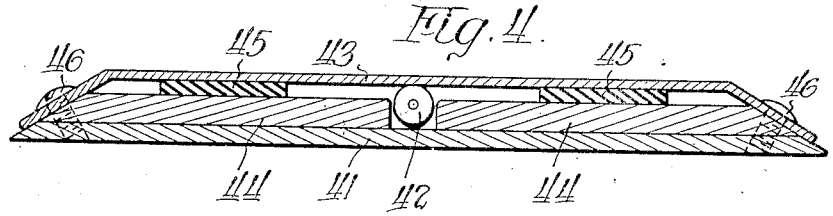
Fig. 4.
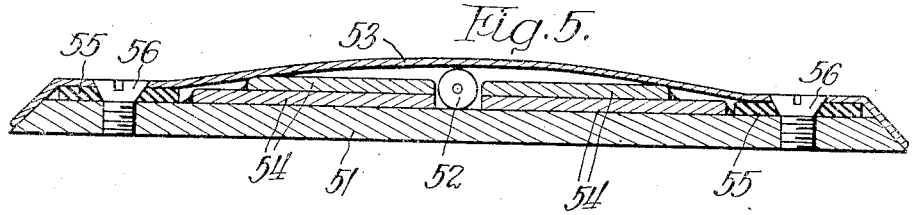
Fig. 5.
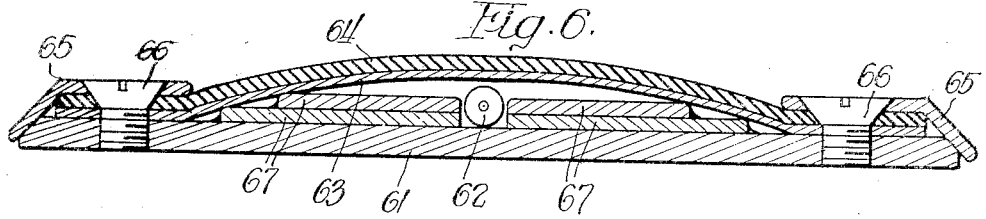
Fig. 6.
Fig. 2.
INVENTORS:
Weldon O. Hampton,
Aldo E. Nessler.
BY
ATTORNEY.

Oct. 11, 1938.  W. O. HAMPTON ET AL  2,132,685
CONTACT MEANS
Filed June 4, 1934  3 Sheets-Sheet 2
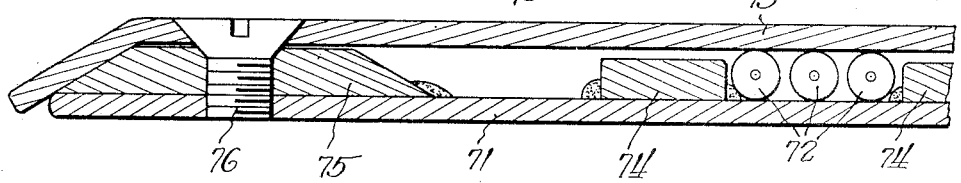
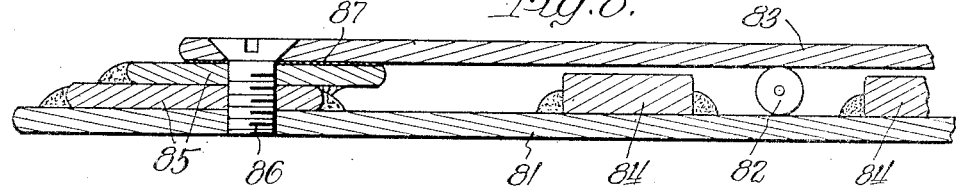
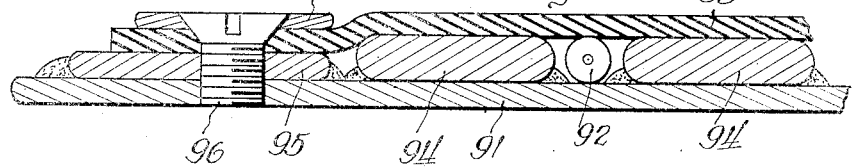
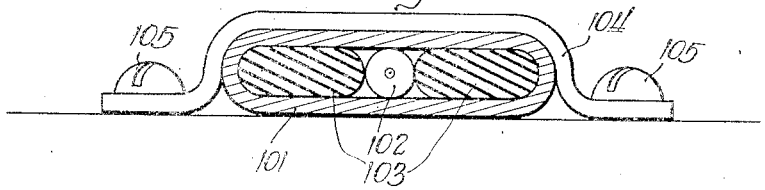
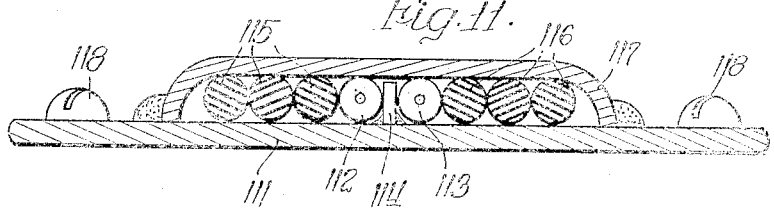
INVENTORS:
Weldon O. Hampton,
Aldo E. Nessler.
BY
ATTORNEY.

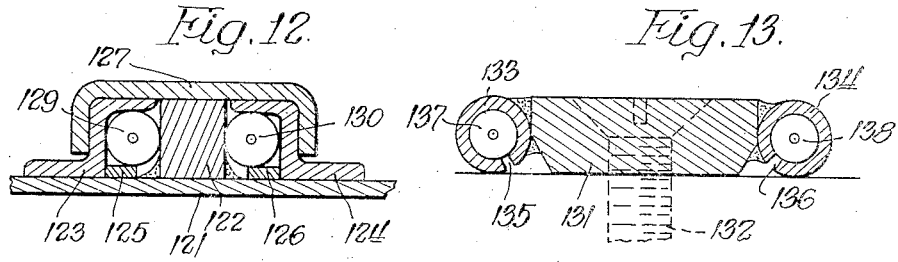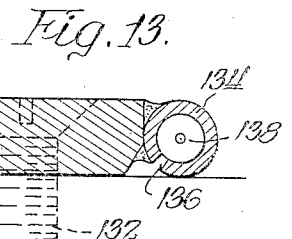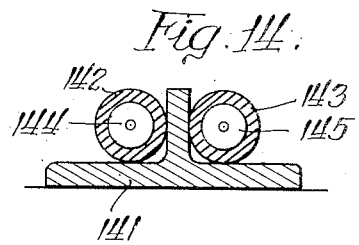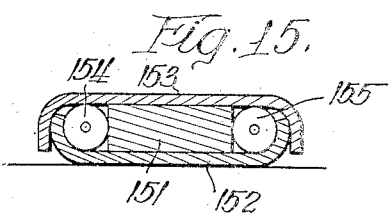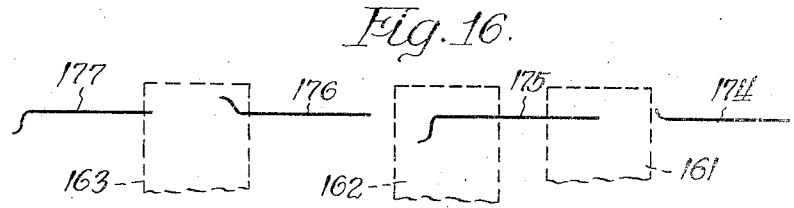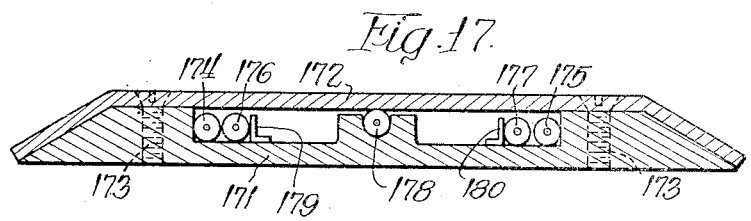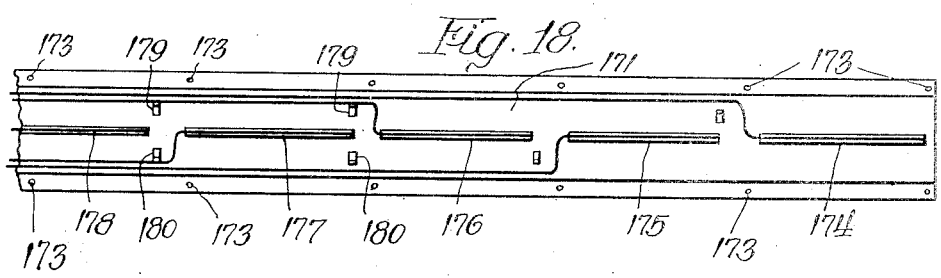

Patented Oct. 11, 1938

2,132,685

UNITED STATES PATENT OFFICE 2,132,685

CONTACT MEANS

Weldon O. Hampton, Chicago, and Aldo E. Nessler, Evanston, Ill., assignors to Delta-Star Electric Company, Chicago, Ill., a corporation of Illinois Application June 4, 1934, Serial No. 728,992

4 Claims. (Cl. 200—86)

Our invention relates to contact means and contact devices and is particularly concerned with novel and improved structures of contact treads such as may be employed in traffic counting and traffic control systems and the like.

The known contact devices of this character are of rather expensive structure. They usually employ metallic contact strips or contact plates of desired length spaced from each other either depending on the resiliency of the metal or by separate spring means, and placed within a rubber casing which is usually disposed in a metal cage or housing arranged for disposal within an excavation of corresponding size which may be provided in the pavement of a traffic lane.

Such structures may be generally speaking satisfactory but they exhibit drawbacks aside from the expenses involved in their manufacture. They are bulky and cannot be placed on the pavement without endangering the safety of the traffic. An excavation is therefore necessary in any case where such contact devices of known structure, as above intimated, are used. As far as the features of operation are concerned, this might not necessarily indicate a handicap in a permanent installation. The only effect will be the increased cost if it is assumed, of course, that the structure is technically as perfect as it can be made in any given case. However, it will be seen at once that the necessity for excavating presents a serious drawback if a temporary use of such a contact device is contemplated, such as may be indicated in the case of traffic counts rather than permanent traffic control at any given locality. Neither should the many locations be ignored where a temporary excavation is practically out of question, such as on a bridge or the approach to a bridge, yet where a traffic count might be and usually is of utmost importance.

Our invention is designed to overcome the difficulties and drawbacks briefly intimated above and to produce a device of this character which can be manufactured and installed at less expense and which will at the same time be more positive and more sensitive in operation and also adapted for more universal use. Some of the objects of our invention may be briefly stated as follows:

One object of our invention is concerned with the structure of a contact device of this character employing a separate and removable contact member proper which can be manufactured in quantities according to more economical methods and, therefore, cheaper than is possible by using contact means which must be designed and produced individually for any given tread structure.

Another object has to do with a tread structure wherein a plurality of contact means may be employed either arranged for mutual cooperation and/or including spare contact means that might be connected in the circuit in case of trouble.

A further object may be found in the structure of a positively operating contact device that can be employed, if desired, for temporary purposes without the necessity of excavating the pavement.

Still another object relates to provisions in conjunction with such a device for readily exchanging the contactor or contact means proper without the necessity of dismantling the entire apparatus.

Other objects are concerned with improvements in detail parts; with incorporating in our invention a structure permitting the use of practical and economical metal casings including a metal cover; with structures for use in non-directional as well as in directional counting or traffic control systems; and with numerous other improvements which will appear from the detailed description rendered below with reference to the drawings in which:

Fig. 1 shows the structure of the contactor or contact means proper;

Fig. 2 indicates one embodiment of our invention in its simplest form;

Figs. 3 to 9, inclusive, illustrate several embodiments of our invention as it may be realized in non-directional heavy duty contact tread devices;

Fig. 10 shows the embodiment of a device for relatively light duty;

Figs. 11 to 15, inclusive, illustrate our invention as applied to various structures primarily intended for use as directional contact tread devices; and Figs. 16, 17 and 18 show a contact tread device made in accordance with our invention and a diagram for explanatory purposes.

The invention will now be described in detail, first with reference to the contact means proper or contact cable as illustrated in Fig. 1. This contact cable is similar to the contact cable disclosed in the British patent to Nagy, No. 272,893, but will be briefly described herein to avoid the necessity of consulting said patent.

Referring now to Fig. 1, the contact cable or contact device illustrated in this figure in plan view and partially in cross section comprises a central metallic member indicated by the numeral 11. Around this member 11 which may be a metal wire are provided the wires 12 arranged to contact member 11 and to form therewith the core of the device. Placed around the core and helically disposed thereon may be the contact wire or inner pole 13. The contact wire thus holds the core assembly consisting of member 11 and wires 12 in the position shown. In the spaces between the coils of the contact wire 13 is disposed the insulation cushion 14. This cushion may consist of a strip of resilient insulating material, such as rubber, in which may be embedded a wire 15 for the purpose of facilitating the handling and placement of the insulation cushion between the coils of the contact wire 13. The cooperation of the insulation cushion 14 which rests on the wire core 12 between the windings of the contact wire 13, as shown, produces recesses such as indicated by the numeral 16. In other words, the contact wire 13 is now disposed between the coils formed by the insulation cushion 14. Placed around the insulation cushion are wires 17 around which is wrapped a covering cushion 18 as shown. The latter may be covered by a suitable fabric 19. Thus, the wires 17 are electrically insulated or isolated by the insulating cushion 14 from the contact wire 13 and thus from the core of the device. The core, composed of the members 11 and 12 and including the conductor 13 forms one pole, and the wires 17 form the other pole of the device.

If it is assumed now that a pressure is exerted on the contactor device or contact cable shown in Fig. 1 at any place along its body, such pressure will be transmitted from the covering fabric to the covering cushion 18 and from there to the wires 17. The latter will press on the insulation cushion 14 and will compress the same, and finally the contact between the outer pole 17 and the inner pole conductor 13 will be established by the wires 17 engaging the helical contact wire 13. This condition is illustrated in Fig. 1 by the arrow at the right end of the drawing. If it is assumed that current is connected to the inner pole of the device composed of the members 11, 12 and conductor 13 and also to the outer pole 17, a circuit will now be established at the place indicated by the arrow in Fig. 1, namely, where the pressure is exerted on the device. The inner pole and the outer pole will be in electrically conductive engagement. The same effect will be produced responsive to pressure at any place along the body of the device shown in Fig. 1.

The contactor or contact cable described above is employed in our contact tread device and takes the place of the usual contact means therein. It will be realized that the difference between using a contact cable or means, such as above described, and the orthodox contact strips or contact plates extending throughout the length of a contact tread of this character is a basic one. Our device is more sensitive and will respond to the application of less pressure than is necessary for effecting the operation of relatively rigid contact plates. Our device will therefore respond quicker and will not necessitate a wide effective contact area as is the case with previously known devices of this character. As far as the manufacture of the contact-cable or contactor means above described is concerned, as contrasted with the manufacture of metallic strips or plates, it may be stated that the contact cable described herein may be manufactured according to well known quantity production methods in the cable manufacture. The contactor may be provided in bulk on cable drums, and the desired lengths may be simply cut off and employed in our novel contact tread, whereas in case of contact treads employing metallic strips or plates, it is necessary to cut and fit these contact plates or strips individually for each desired tread structure. Another advantage resides in the fact that this contact device is flexible throughout its length.

It will be apparent from the above explanation that the use of a contactor, such as shown in Fig. 1, in a contact tread for traffic control in its broadest meaning represents the realization of an important object of our invention, namely, the use in a contact tread for traffic control and the like, of a contact means comprising a centrally disposed pole and a companion pole placed around said pole and spaced therefrom by means of a resilient member or members.

One of the simplest applications of our invention is indicated in Fig. 2. In this case the contact tread device consists merely of the rubber casing 20 in which is disposed the contactor of the construction shown in Fig. 1 and designated in Fig. 2 by the numeral 21. The insertion of the contactor 21 in the rubber casing 20 may be effected by the provision of a longitudinal slot at the bottom of the casing 20, as indicated by the reference numeral 22. All that is necessary for mounting the contactor 22 in its flexible casing 20 is transverse distortion and stretching of the casing so as to open the slot 22 and to force the contact cable through the slot until it assumes the position shown.

Such a structure as described above has several virtues. In the first place, it is easily manufactured and can be furnished at reasonable cost. It is also easily transported to any location where its use is desired. Wherever temporary installations, for example for effecting traffic counts for supervisory or statistical purposes and the like are desired, the embodiment shown in Fig. 2 will serve well. It can be placed on the pavement without necessitating any excavation. The counting device or metering device will be connected in a circuit including the inner and the outer pole, respectively, of the contact means 21, and the device will be ready for operation. Vehicles will roll over the device without any hazard to the safety and, in rolling over the same, the pressure applied by the weight of the vehicle and the impact on the device will produce the engagement of the outer pole with the inner pole and therefore a closure of the metering or counting circuit. The overall depth of this device may be very little, for example, between ½ and 1 inch, or somewhat more depending on the purpose, and it will be realized that such an object on the pavement does not represent any hazard to the safety of the traffic at any speed.

It should be noted at this point that the simple device described above with reference to Fig. 2 represents a considerable improvement over prior constructions of this kind, being composed essentially of two unitary members, each of which is flexible, and permitting speedy assembly as well as efficient application.

Of course, a device such as shown in Fig. 2, although very well adapted for temporary purposes, will perhaps not meet the requirements of a heavy duty permanent installation without some modification. It should be observed, however, that prior devices of this character do not contemplate a contact tread composed mainly of two parts, that is, of a self-contained flexible contactor proper comprising contact members which are insulated from each other and encased in an insulation covering, disposed within a flexible unitary casing, whereby the arrangement of the contactor within the flexible casing is accomplished without any mounting or dismounting operations necessitating the use of tools. Neither do devices of this character hitherto known contemplate a contact tread which is flexible in its entire structure. The importance of this feature is not to be underestimated since it facilitates transportation of the contact device, and since this is an important item in the case of temporary application of the device.

An embodiment of a heavy duty permanent contact tread structure is illustrated in cross section in Fig. 3. This structure is similar to the device as illustrated in Fig. 2 in that a rubber tread member 34 transmits pressure to the contact cable 32. It differs, however, in several constructional details, being a reinforced heavy duty tread device for permanent service rather than for temporary application as previously described. The structure includes the steel base 31 having a longitudinal groove centrally formed along its upper side in which the contact cable 32 is disposed, as shown. The restoring spring member 33 may be provided on the base plate 31 to support the rubber tread 34 so that little or no pressure is normally exerted on the contact cable 32. The edges of the rubber tread member 34 are protected and held securely in place against the base plate 31 by means of the steel angle bars 35 which may be clamped down by screws such as 36. A tight seal therefore exists between the base 31 and the tread member 34 whereby the contact cable 32 is preserved from deterioration and obstructing foreign matter is excluded from the chamber formed over the base plate by the spring member 33.

The contact assembly or tread may be firmly secured to the pavement by means of bolts (not shown) passing through holes in line with the holes through which clamping screws 36 pass. The base member 31 may also be made wider than shown or may be provided with suitable ears or extensions for accommodating attaching means. It should be noted, however, that this device as well as any of the contact tread devices disclosed herein can be successfully employed without permanent attachment to the pavement.

In operation, the wheel or tread of a vehicle will pass over the tread structure of Fig. 3 and the weight on the rubber tread member 34 will cause a downward pressure to be applied through the restoring spring member 33 to the contact cable 32. The two poles of the cable (see Fig. 1) will make electrical contact with each other, as previously described. Since the cable 32 is disposed in a groove, as shown, it is not damaged by a heavy weight passing over the structure. The restoring spring member 33 can be depressed only until it makes intimate contact with the main body of the base plate 31. In other words, the deflection of member 33 is definitely limited to the requirements of operation within safe limits of reliable performance. The base and the groove in which the contact cable is disposed in conjunction with the member 33 which is arranged to compress the cable for effecting its operation represent essentially means for preventing the crushing of the cable. This structure will permit only such compression, regardless of the force applied, as will be well within the performance characteristics of the contactor. This feature, it should be noted, is to be found in all the structures disclosed in this application. When the weight is removed from the device, the tread member 34 is restored to the position shown due to its inherent resiliency and also due to the action of the member 33 acting as a restoring means. The two poles of cable 32 then break electrical contact with each other, thereby initiating and/or terminating, as the case may be, the signal or current impulse or impulses used for actuating the corresponding recording, indicating and/or signalling apparatus provided for cooperation with the tread structure.

It is to be noted particularly that the permanent structure of Fig. 3 is well suited for installation on the surface of a roadway. Therefore, it may be used not only on ordinary street or road pavement, but also on bridges, approaches to bridges and the like, where the installation of the conventional flush-type of contact tread, which requires excavation, is not ordinarily feasible because of the character of the underlying roadway or pavement structure. This tread device on account of its low and compact structure will serve also as a portable device to be used for temporary purposes such as required for observation of traffic or the like, and when used thus it will not ordinarily be found necessary to secure it to the pavement.

In operation, should the contact cable in the structure of Fig. 3 develop a fault, the cable may be withdrawn from the device at one end thereof and readily replaced by a new one without in any way disturbing the remaining portions of the structure, as the cable rests relatively loosely in the groove provided on the base plate 31. In the event, however, that removal of the tread cover and of member 33 should be required or desired, the screws 36 may be removed along one side of the structure to permit the tread 34 and the spring or plate member 33 to be lifted to free the contact cable 32 for inspection or replacement. Obviously the spring member 33 may be repaired or replaced by a new one at such time. The term "spring member" is used for convenience' sake: Member 33 is not a spring in the ordinary sense, but is merely a suitable curved member, preferably made from springy or resilient material. Its function is to actuate as well as to protect the contactor and to assist in the restoration of the tread or cover of the device.

Referring now to Figs. 4 to 9, inclusive, these figures show in cross section modifications of the structure of Fig. 3.

A feature of the structure of Fig. 4 is that it may be assembled of standard steel stock with a minimum of forming and/or machining operations. The contact cable 42 is disposed on the base plate 41 in the groove formed by the two protection or spacer plates 44 which are preferably welded or otherwise secured to the base plate 41. Plates or members 45 in turn may be preferably welded to the protection and spacer plates in the position shown in order to support the metal tread or cover member and to hold it out of effective engagement with the contact cable 42. If desired, these members 45 may be made of resilient material such as rubber. Their function is to support and to space the cover member properly and to protect the contact cable operatively as previously noted. This function can be accomplished by the use of either rigid metallic or of resilient members 45 interposed between the cover and the base of the device. The sloping edges of the tread or cover member 43 are firmly secured to the base assembly by screws 46 whereby the entire assembly is reinforced. The openings in the cover provided for the screws may be somewhat slotted if desired. A suitable gasket (not shown) may be provided to secure the contact seal between the tread member 43 and the base assembly. Effective operation of the contact cable 42 anywhere along the length of the device is secured when the central portion of the tread member 43 is pressed downward under the weight of the wheel of the passing vehicle or generally responsive to pressure applied to it. It is understood, of course, that the cover material is somewhat resilient.

The structure illustrated in Fig. 5 is similar to the structure in Fig. 4 in that it may be assembled of flat stock material but differs in the surface of the tread cover which in this instance is curved, and in other structural details as pointed out below.

The protection or spacer plates 54 may be welded together and secured to the base slab 51 in the position shown, forming a longitudinal protecting groove in which may be disposed the contact cable 52. The metal tread or cover member 53 is curvedly and angularly formed as shown. It lies on the rounded outer edges of the upper protection plates 54 and in contact with the sloping machined outer edges of the base member 51. The screws 56 clamp the base member and the tread member firmly together, the desired spacing being provided by the rubber strips 55 which hold the tread member resiliently in position and provide an effective seal. When pressure is applied to the tread member 53, for example, in response to the contacting of a passing vehicle, the curved portion of the tread member is temporarily flattened out, compressing the contact cable 52 so that the two poles thereof come into temporary electrical contact as previously discussed with reference to Fig. 1. It should be observed that this structure also excludes crushing of the contact cable due to the spacer and protecting means which limit the motion of the cover tread.

The modification illustrated in Fig. 6 is similar to the preferred construction illustrated in Fig. 3 in that a curved tread surface is provided by the rubber tread member 64 which may be clamped between the base 61 and the angular clamping strips 65 by the screws 66. The restoring spring member 63 underlies the tread member 64 throughout the entire width thereof, being held firmly against the base member 61. A suitable gasket (not shown) may be placed under each outer flat section of the restoring member 63 to provide the desired seal. The spacing and protecting strips 67 may be welded in place to provide a groove for cable 62 and a support for a portion of the spring member in normal position. They will also act to stop the downward movement of the tread assembly when the contact cable 62 is depressed sufficiently to make electrical contact in response to pressure applied to the device.

The cross section illustrated in Fig. 7 is broken away at a point to the right of the central line. Features of this embodiment are that a relatively heavy spring tread member 73 is supported only at its outer edges and that the groove formed by the spacing of the stop and protecting strips 74 is sufficiently wide to accommodate a plurality of contact cables 72. One cable may be connected for use in the corresponding circuit and the others may be reserved to take the place of spare cables to be used in the event that a breakdown occurs in the cable which is at any time in use. A plurality of these cables may also be used simultaneously in the same or in separate signalling circuits, if desired. It should be noted that the designation "signalling circuits" or "control system" and equivalent expressions are used and applied herein to denote broadly systems employing such vehicle actuated contact treads regardless of their particular structure, purpose and/or specific performance.

The strips 74 and 75 may be secured by welding or the like to the base 71 as indicated. The support strips 75 may be of stock sufficiently thick to support the tread 73 at such a distance from the base 71 that the contact cables 72 lie relatively loosely between base 71 and the lower surface of tread member 73. Screws 76 hold the tread 73 firmly in position, the seal being effected by means of suitable gaskets if desired. When pressure vehicular or otherwise is applied to the tread 73, the central portion thereof will be deflected or flexed and pressed downwardly causing each of the cables 72 to be compressed temporarily into effective electrical operating position. This tread structure will be well suited for operation where heavy vehicle traffic, for example, freight traffic is predominant.

The modification illustrated in Fig. 8 is similar to the one shown in Fig. 7 but is distinguished by the feature that the tread member 83 is formed of a flat steel plate without formed edges while the approach slope is formed on either side by the successive set-back of the members 81, 85 and 83. The welded points of members 85 in relation to the base member 81 are indicated in the drawings. This provides an extremely economic and yet reliable construction. A gasket 87 may be used to furnish the seal. The gasket may be disposed as shown, between the tread 83 and the upper spacer strip or plate 85. The groove between the stop strips is made wide enough to accommodate a plurality of contact cables 82, if desired. Only one of these contact cables is shown in position.

In Fig. 9, a rubber tread member 93 is provided. The unique structure, however, renders unnecessary the provision of a restoring spring member such as 33 or 63 shown in the Figs. 3 and 6 respectively. The edges of the rubber tread member 93 are clamped between strips 97 and the spacing strips 95 which may be welded to the base 91 as indicated. An effective seal is thus provided. It is also to be noted that the tread member 93 lies directly on the stop members 94 which have rounded edges and which may be welded to the base 91 as indicated. When the wheel of a vehicle passes over the tread 93, the unsupported central portion lying over contact cable 92 is depressed to cause the two poles of the contact cable 92 to be forced into electrical engagement. The insulating covering of the contact cable as discussed in connection with Fig. 1 in conjunction with the manner of placing the contact cable in operative position between the members 94 prevent damage to the contact cable responsive to the pressure applied to the device, regardless of the load within the operating limits of the corresponding system. Thus, while considerable pressure cannot do any damage, only relatively light pressure is actually required for operating the device. It should also be considered in this connection that the downward displacement does not increase proportionately with the load because of the greatly added force required to displace a stretched membrane still further as is well known.

In Fig. 10, there is illustrated in cross section a modification especially developed for light duty, that is to say, for operation at such points where traffic is relatively light. A minor thoroughfare crossing a major highway presents such an occasion. Numeral 101 represents a tubing which may be made of flattened stainless steel or the like. Rubber members 103 lie within the tube 101 and leave space for the contact cable 102 which is disposed between them. Brackets such as 104 spaced at desired intervals along the length of the tube may be employed for holding the tube to the roadway, being secured by screws 105. When pressure is exerted on this device, for example, when a wheel of a vehicle passes over the tube 101, the tube will be compressed slightly and in turn will compress and thereby actuate the contact cable 102. This tendency is increased by virtue of the resulting compression of the rubber members 103. In this way the cable 102 is definitely and effectively actuated by direct compression of the tube 101 as well as by the resulting lateral compression of the compressed members 103. When the vehicle has passed, the parts concerned will immediately resume normal position. It will be appreciated that this embodiment can be produced very economically for use in locations not demanding a heavy duty structure.

As previously mentioned, Figs. 11 to 15, inclusive, illustrate modifications of our invention intended for use where directional operation is indicated, for example, as contact devices operating selectively with regard to traffic direction. However, certain features of these devices may also be desirable and may be applied in non-selective or non-directional contact tread structures. The term "directional" as used herein denotes a device which will produce different signals or cause different operations, or wherein different conductors are actuated responsive to pressure applied to the device from one or from the other side thereof, in short, a device arranged to differentiate as to the direction of force, i. e., in this case, direction of traffic. Conversely, the term—"non-directional"—is used to denote such an embodiment of our invention which will be actuated or will cause actuation of other apparatus in the same way regardless of the direction from which the actuation initiates.

In Fig. 11, the inverted member 117 represents the tread member which may be welded to the base slab 111 to which the centrally located stop bar 114 is secured, for example by welding. The base 111 may be attached to the roadway by means of screws such as 118. Contact cables 112 and 113 of the structure illustrated in Fig. 1 are disposed alongside of the stop bar 114. The resilient spacers 115 which may be of rubber or the like lie to the left of cable 112 while similar spacers 116 are disposed to the right of cable 113. It should be noted that there is a slight clearance space between stop bar 114 and the lower surface of the tread member 117 to permit a slight downward motion of the tread member responsive to pressure applied to it. This clearance space, however, is not sufficient to permit enough perpendicular downward movement of the tread member 117 to operate either of the cables 112 and 113.

Now, assuming that lateral pressure is applied to the tread member 117 from a direction initiated from the left and proceeding substantially horizontally to the right, when the object, for example, the wheel of a vehicle strikes the tread member 117 at the left side thereof, this tread member will be flexed and compressed toward the right by the horizontal thrust imparted by the wheel as it rolls up over the edge of the tread member. This impact and motion squeezes the rubber spacers 115 against the contact cable 112 to effect its electrical actuation, while the space containing cable 113 and spacers 116 is temporarily and momentarily enlarged. This differentiation it is to be noted is made possible by the partitioning effect of the stop bar or member 114. As the object rolls along the center of the tread member, the same will be depressed slightly in a wave motion tending to crowd the rubber spacers 115 still tighter against the cable 112 and compress it still further and to bring its poles into firmer electrical contact. Throughout the movement of a wheel over the tread in a given direction, the directional thrust will continue. It should be considered that the device is rather narrow, making the stopping of a wheel thereon unlikely and in practice virtually impossible. However, as previously mentioned, the stop 114 limits the downward movement of the central portion of member 117 in case a very slowly moving vehicle should pass over the device so that the cable 113 is not compressed perpendicularly to a sufficient extent so as to bring its poles into electrical engagement. Such a case is, however, more of a theoretical nature with little, if any, practical significance or consequence.

As the wheel of a vehicle continues to roll across the tread, the above mentioned directional compression wave moves on to the right, tending to crowd the rubber spacers 115 to the right and still further remove pressure from contact cable 113. The directional contact is thus accomplished for the actuation of the associated indicating signalling or recording equipment as the case may be. The normal position will be resumed when the lateral pressure motion ceases, that is, when the wheel of a vehicle leaves the device at the right side thereof.

In the above described way a wheel rolls across the tread structure and actuates only one of the two contact cables, namely, in the assumed case, only the left contact cable 112. When a wheel rolls across the tread structure from right to left, the above noted initial horizontal thrust and the subsequent wave motion are from right to left, causing compression of the spacers 116 and actuation of contact cable 113 while the cable 112, which is sheltered by the stop bar 114, is not electrically actuated.

In Fig. 12, the heavy stop bar 122 may be welded to the base 121 while the angle bars 123 and 124 lie on either side of the stop bar to form ducts for the selectively operable contact cables 129 and 130, respectively. The flat bars 125 and 126 form rests for cables 129 and 130, respectively. The edges of these bars should preferably be rounded. The tread member 127 overlies the assembly as shown. When the wheel of a vehicle strikes the tread member 127 from the left, the impact shifts the tread member to the right, forcing the angle bar 123 to compress the contact cable 129 sufficiently for electrical engagement of its poles. It should be considered that the operation of the contact cable requires very little mechanical motion since the inner pole is separated from the outer pole merely by a fraction of an inch, in practice, less than ⅛ of an inch in most cases, depending, of course, on the structure of the cable. An inspection of Fig. 1 will show, however, that only very little motion is required for effective operation. In the event of a heavy impact, the upper right edge of angle bar 123 will engage the stop bar 122, thereby preventing damage to contact cable 129. As the wheel passes over the tread member and proceeds to the right, the assembly assumes normal position but the contact cable 130 is not effectively actuated since there is no impact from the right of the device. However, when a vehicle approaches from the right and passes over the tread to the left, the shift is to the left side and therefore cable 130 will be actuated to accomplish the corresponding contact operation. In this instance, the cable 129 will remain unaffected.

In Fig. 13, the cable tubes 133 and 134 are secured by welding or the like to the heavy bar 131 to form the edges of the tread. The bar 131 may be secured to the pavement by means of screws such as 132. The tubes 133 and 134 may be longitudinally slit or split at 135 and 136 to facilitate compression thereof. The impact of a moving object at the left of the device will compress tube 133 to effectively squeeze contact cable 137 while an impact from the right will compress the tube 134 to operate cable 138.

In considering this operation it should be remembered that the directional actuation of these devices depends on the directional force of vehicles operating in different directions of movement. Since the movement occurs in a horizontal plane, the directional force will be horizontal. The perpendicular components of this force will diminish with increased speed and will come fully into play only when the vehicle stops. Now, since we have to consider mainly moving forces in conjunction with the tread devices of our invention, it is apparent that we have to take into consideration mainly the directional forces thereof. If it is considered in addition that the size of the devices made in accordance with our invention may be considerably smaller than the customary sizes of known devices of this character, it will also be seen that the perpendicular components of the moving forces can be neglected for practical consideration.

In Fig. 14, the tubes 142 and 143 are preferably of steel and welded to the T-bar base 141. As in the embodiment shown in Fig. 13, the directional wheel impact against either edge of this device is depended upon for selective operation of cables 144 and 145, respectively. Due to the momentary compression of the corresponding tubes 142 and 143 in response to a directional impact and since these tubes are not slotted, a momentary slight flattening at the point of impact is depended upon for contact cable compression. It is understood, of course, that slotted tubes or cable casings may be employed.

In the embodiment shown in Fig. 15, the strips 152 and 153 may be welded or otherwise fastened to the heavy bar 151 to form the two ducts for the contact cables 154 and 155. The selective operation of this embodiment is similar to that described in connection with Fig. 13. The resiliency of the structure at the edges of the device where the contact cables are disposed is utilized for effecting their operation.

Referring now to Figs. 16 to 18, they illustrate a modification of the invention which is especially suitable for counting use on a highway whereon several cars may travel in different directions, or where one or more cars travelling in one direction may cross the tread line at a time when one or more cars cross it coming from the other direction. In order to avoid interference or loss of accuracy of many counts on account of simultaneous crossing of the tread or counting line, it is desirable that a separate contact cable be used for each traffic lane. This, of course, could be accomplished by using an entirely different contact tread for each lane; but this besides necessitating several treads placed in line requires surface conduits or embedded conduits to connect the cables of the inner lane treads with the counting equipment at the roadside. We have, therefore, constructed a tread in which can be accommodated a plurality of cables, each provided for a separate traffic lane. Figs. 17 and 18 illustrate such a multi-cable contact tread long enough to extend over several traffic lanes, wherein each cable is sensitive to vehicular contact in only one predetermined traffic lane. Fig. 16 is an accompanying diagram to be referred to subsequently and illustrating a certain point of operation in conjunction with the tread structure shown in Figs. 17 and 18.

Referring now to the device shown in cross section in Fig. 17, the steel tread member 172 may be fastened to the base 171 by means of screws such as 173. Sealing gasket means may be employed if desired. The base may be machined or otherwise formed into the indicated cross section with a central groove for supporting contact cable such as 178 and side ducts for accommodating other cables. Spacer and protection and/or stop members may be employed and assembled with the base as described with previous embodiments. The sides of the walls or projections forming the central groove are spaced sufficiently below the bottom of the tread member to allow a contact cable, such as 178 disposed in the central groove or duct, to be compressed and thereby electrically actuated when a vehicle passes over the tread. It should be noted that the side grooves or ducts are somewhat deeper than the central groove. This feature combined with the fact that the downward motion is less along the sides of the tread than at the center prevents actuation of the cables such as 174 to 177, lying within the side grooves. The brackets 179 and 180 hold the cables in place near the outside of the side grooves in the least sensitive area of the device.

Now, upon examining Fig. 18, it will be seen that it is a somewhat diagrammatic plane view of the structure of Fig. 17 with the tread member or cover 172 removed but with the contact cables in place in their respective positions in the base 171. In the central groove of this device which represents the sensitive area thereof, will be provided a number of contact cable sections, their placement corresponding to the traffic lanes. Each contact cable section is connected by conductors or cables disposed in the side grooves or in the least sensitive area of the device with the outside, as indicated in Fig. 18. It will, therefore, be seen that although there is a single tread structure provided to extend over several traffic lanes, the contact cables are selectively operable in accordance with traffic lane widths and prevailing conditions. For example, cable 174 lies in the central sensitive area groove for a distance corresponding to the width of the right hand traffic lane but passes over to a side duct for the remaining distance. Similarly, each of the cables 175 to 178 is sensitive to wheel pressure in only a single portion of the tread length, lying in a side duct for the remaining portion. It is apparent, of course, that the sides of the central groove may be cut away at desired spacings to permit the passage of the cables from the central groove to a side groove.

The dividing lines between traffic lanes are usually painted on the surface of the pavement. It is a recognized fact, however, that the drivers do not always observe the lane division lines but occasionally drive along partly in one lane and partly in another whereby one vehicle, for example, the vehicle designated in Fig. 16 by the numeral 163 may cause two contact cables, for example, 176 and 177 to be actuated simultaneously. With a separate counting device connected to each cable, such a vehicle would be registered twice, once on each counter provided for the corresponding lanes. However, the naturally arising discrepancies of the traffic compensate for this contingency. For example, again considering Fig. 16, it may be observed that two separate vehicles, such as 161 and 162, may drive and contact a single contact tread 175 at the same time. One counting discrepancy in a certain traffic lane is therefore more or less compensated for and set off by discrepancies occurring in another lane. In other words, while it is true that one car may simultaneously actuate two contact devices of two separate lanes, it is also true that a plurality of cars may and will at times cause the operation of only one contact device in another lane. Directional features may, of course, be incorporated in the structure and system shown in Figs. 16 to 18.

Numerous modifications will occur to those skilled in the art. We wish, therefore, to have it distinctly understood that we have shown and described definite structures and embodiments of our invention for the sake of description rather than for the purpose of indicating limitations. Our invention is specifically pointed out in the appended claims and we intend to use and to apply all such features singly and combined that fall within the scope and spirit of the claims.

What we claim as our invention is:

1. A contact device for use on a roadway in the path of vehicular traffic, said device comprising a housing member adapted to extend across the roadway on the surface thereof, said member including a rigid base and a pair of straight rigid spaced strips secured thereto forming a channel, a contact cable removably disposed in said channel, said cable including two conductors normally separated from each other, and a resilient cover disposed on said strips and on said base and adapted to be compressed by the wheels of a vehicle to compress said cable and effect contact between the conductors thereof, said strips forming a stop for the downward movement of said cover and determining the maximum extent of compression of said cable.

2. A contact device for use on a roadway in the path of vehicular traffic, said device comprising a base adapted to lie on the surface of the roadway and having an open channel on top, a contact cable disposed loosely in said channel and projecting above the sides thereof, said cable including two conductors normally separated from each other, a flexible cover substantially covering said base and the said channel with the cable contained therein, a pair of sloping side members clamping said cover to said base, and a curved spring member inserted between the cover and base and serving to support the central portion of the cover above the cable, said cover and spring member being adapted for depression by the wheel of a vehicle to compress said cable and effect contact between the conductors thereof at the point where the cable is compressed.

3. In a contact device for operation by vehicular traffic, a housing, a contact cable disposed in said housing, said cable including two normally separated conductors adapted to be brought into engagement by compression of the cable responsive to passage of a vehicle, and means in said housing permitting operative compression of said cable by the passage of a vehicle in one direction and preventing operative compression of said cable by the passage of a vehicle in the opposite direction.

4. In a contact device for operation by vehicular traffic, a housing, two parallel contact cables enclosed in said housing, each cable including two normally separated conductors which are adapted to be brought into engagement by compression of the cable responsive to passage of a vehicle, and means included in said housing for preventing operative compression of one cable by a vehicle moving in one direction and for preventing operative compression of the other cable by a vehicle moving in the opposite direction.

WELDON O. HAMPTON.
ALDO E. NESSLER.